United States Patent
Franke et al.

(10) Patent No.: US 9,967,146 B2
(45) Date of Patent: *May 8, 2018

(54) CREATING NEW CLOUD RESOURCE INSTRUCTION SET ARCHITECTURE

(71) Applicant: INTERNATIONAL BUSINESS MACHINES CORPORATION, Armonk, NY (US)

(72) Inventors: Hubertus Franke, Cortlandt Manor, NY (US); Chung-Sheng Li, Scarsdale, NY (US); Colin J. Parris, Austin, TX (US)

(73) Assignee: International Business Machines Corpration, Armonk, NY (US)

( * ) Notice: Subject to any disclaimer, the term of this patent is extended or adjusted under 35 U.S.C. 154(b) by 355 days.

This patent is subject to a terminal disclaimer.

(21) Appl. No.: 14/742,143

(22) Filed: Jun. 17, 2015

(65) Prior Publication Data

US 2016/0269229 A1  Sep. 15, 2016

Related U.S. Application Data

(63) Continuation of application No. 14/656,334, filed on Mar. 12, 2015.

(51) Int. Cl.
*H04L 12/24* (2006.01)
*G06F 9/50* (2006.01)
*H04L 29/08* (2006.01)

(52) U.S. Cl.
CPC .......... *H04L 41/083* (2013.01); *G06F 9/5072* (2013.01); *H04L 41/0886* (2013.01); *H04L 41/0893* (2013.01); *H04L 67/10* (2013.01)

(58) Field of Classification Search
CPC ... H04L 41/083; H04L 41/0886; H04L 67/10; H04L 41/0893; G06F 9/5072
See application file for complete search history.

(56) References Cited

U.S. PATENT DOCUMENTS 7,491,579 B2  2/2009  Delp et al.
7,565,635 B2  7/2009  Chao et al.
(Continued)

OTHER PUBLICATIONS

Brown et al., "The OptIPuter: A National and Global-Scale Cyberinfrastructure for Enabling LambdaGrid Computing", Electronic Visualization Laboratory, University of Illinois at Chicago, Apr. 2006, pp. 1-4.

(Continued)

*Primary Examiner* — Kim T Nguyen
(74) *Attorney, Agent, or Firm* — Tutunjian & Bitetto, P.C.; Jennifer R. Davis

(57) ABSTRACT

A method and system are provided. The system includes a network configurator for configuring a network as a backplane of the system to optimize throughput rate and minimize latency across a plurality of subsystems that are cloud-based and that form the system. The plurality of subsystems includes hardware and software subsystems. The system further includes a composable system building block configurator for refactoring, based on a disaggregated system principle, the plurality of subsystems to use the network to communicate as a single system. The system also includes a system resource multidimensional model generator for generating a multidimensional optimization model that models the composable system building blocks as resources having adjustable parameters in a multidimensional parameter space.

4 Claims, 9 Drawing Sheets

(56) References Cited

U.S. PATENT DOCUMENTS

| | | |
|---|---|---|
| 2002/0122386 A1 | 9/2002 | Calvignac et al. |
| 2012/0159512 A1 | 6/2012 | Michailov et al. |
| 2013/0185436 A1* | 7/2013 | Carlin .................. G06F 9/5011 709/226 |
| 2013/0346987 A1* | 12/2013 | Raney .................. G06F 9/5044 718/102 |
| 2015/0381453 A1* | 12/2015 | Skjolsvold .......... H04L 43/0876 709/224 |
| 2016/0269228 A1* | 9/2016 | Franke ................. H04L 41/083 |

OTHER PUBLICATIONS

Lee, et al., "RAID-II: A Scalable Storage Architecture for High-Bandwidth Network File Service", EECS Department, University of California, Berkeley,Technical Report No. UCB/CSD-92-672, Feb. 1992, pp. 1-18.

Kasputis, et al., "Composable Simulations", Proceedings of the 2000 Winter Simulation Conference, Dec. 2000, 9 Pages.

Simone et I., "Driving the Network-on-Chip Revolution to Remove the Interconnect Bottleneck in Nanoscale Multi-Processor Systems-on-Chip", Università degli Studi di Ferrara, Dottorato Di Ricerca in "Ingegneria Elettronica", CICLO XXI, 2006/2008, 203 Pages.

Puschner, et al., "On Composable System Timing, Task Timing, and Wcet Analysis", ECRTS 2008 8th Intl. Workshop on Worst-Case Execution Time (WCET) Analysis, Jul. 2008, pp. 1-11.

Van Meter, et al., "VISA: Netstation's Virtual Internet SCSI Adapter", Information Sciences Institute, University of Souther California, Dec. 1998, pp. 71-80.

\* cited by examiner

CREATING NEW CLOUD RESOURCE INSTRUCTION SET ARCHITECTURE

CROSS-REFERENCE TO RELATED APPLICATIONS

This application is a Continuation application of co-pending U.S. patent application Ser. No. 14/656,334 filed on Mar. 12, 2015, incorporated herein by reference in its entirety.

BACKGROUND

Technical Field

The present invention relates generally to information processing and, in particular, to creating a new cloud resource instruction set architecture (CRISA) which includes a composable system and software leveraging both disaggregated and hyper-converged subsystems.

Description of the Related Art

The rapid growth of cloud computing both in terms of the spectrum and volume of cloud workloads brought many challenges to the traditional data center design including at least the following: fast changing system configuration requirements due to workload constraints; varying innovation cycles of system components; and maximal sharing of systems and subsystems. Thus, there is a need for solution in a cloud computing environment that can simultaneously overcome the aforementioned challenges.

SUMMARY

According to an aspect of the present principles, a system is provided. The system includes a network configurator for configuring a network as a backplane of the system to optimize throughput rate and minimize latency across a plurality of subsystems that are cloud-based and that form the system. The plurality of subsystems includes hardware and software subsystems. The system further includes a composable system building block configurator for refactoring, based on a disaggregated system principle, the plurality of subsystems to use the network to communicate as a single system. The system also includes a system resource multidimensional model generator for generating a multidimensional optimization model that models the composable system building blocks as resources having adjustable parameters in a multidimensional parameter space.

According to another aspect of the present principles, a method is provided. The method includes configuring, by a network configurator, a network as a backplane of the system to optimize throughput rate and minimize latency across a plurality of subsystems that are cloud-based and that form the system. The plurality of subsystems includes hardware and software subsystems. The method further includes refactoring, by a composable system building block configurator using a disaggregated system principle, the plurality of subsystems to use the network to communicate as a single system. The method also includes generating, by a system resource multidimensional model generator, a multidimensional optimization model that models the composable system building blocks as resources having adjustable parameters in a multidimensional parameter space.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to creating a new cloud resource instruction set architecture (CRISA) which includes a composable system and software leveraging both disaggregated and hyper-converged subsystems In an embodiment, the present principles advantageously address at least the simultaneous challenges typically encountered in a cloud environment of: (1) fast changing system configuration requirements due to workload constraints; (2) varying innovation cycles of system components; and (3) maximal sharing of systems and subsystems.

In an embodiment, the present principles can include and/or otherwise involve the following: a network being used/configured as a system backplane; composable system building blocks; a multidimensional capability and capacity relationship abstraction of underlying composable system building blocks as resources to enable resource optimization as a high dimensional parameter space optimization; and a mechanism and/or framework for self-tuning and self-optimization of the overall system.

In an embodiment, a high throughput low latency network is utilized as the backplane of the "system" which can vary from, for example, but is not limited to, any of: a rack; a cluster of racks; a pod; zones; a datacenter; and multiple datacenters.

In an embodiment, composable system building blocks can be utilized that are based on a disaggregated system principle where the systems and subsystems within a data center are refactored so that all of the subsystems can use the network "backplane" to communicate as a single system.

In an embodiment, a multidimensional capability and capacity relationship abstraction is utilized of underlying composable system building blocks as resources to enable system resource optimization as a high dimensional parameter space optimization. An abstracted composable system resource model provides the combination of abstracting the capability, capacity, and the physical environments such as clustering, pods, availability zones, and datacenter. This abstraction form the basis of the cloud resource instruction set architecture (CRISA). CRISA also enables dynamically stitched together physical resources as logical resources for compute, storage and network based on anticipated the workload requirements for maximal amount of workload throughput, resource sharing and utilization.

In an embodiment, a mechanism and/or framework for self-tuning and self-optimization of the overall system can be utilized. The mechanism and/or framework use the multidimensional parameter space that allowed the parameters or knobs of the composable systems to be continuously adjusted for optimal performance.

Figure 1:
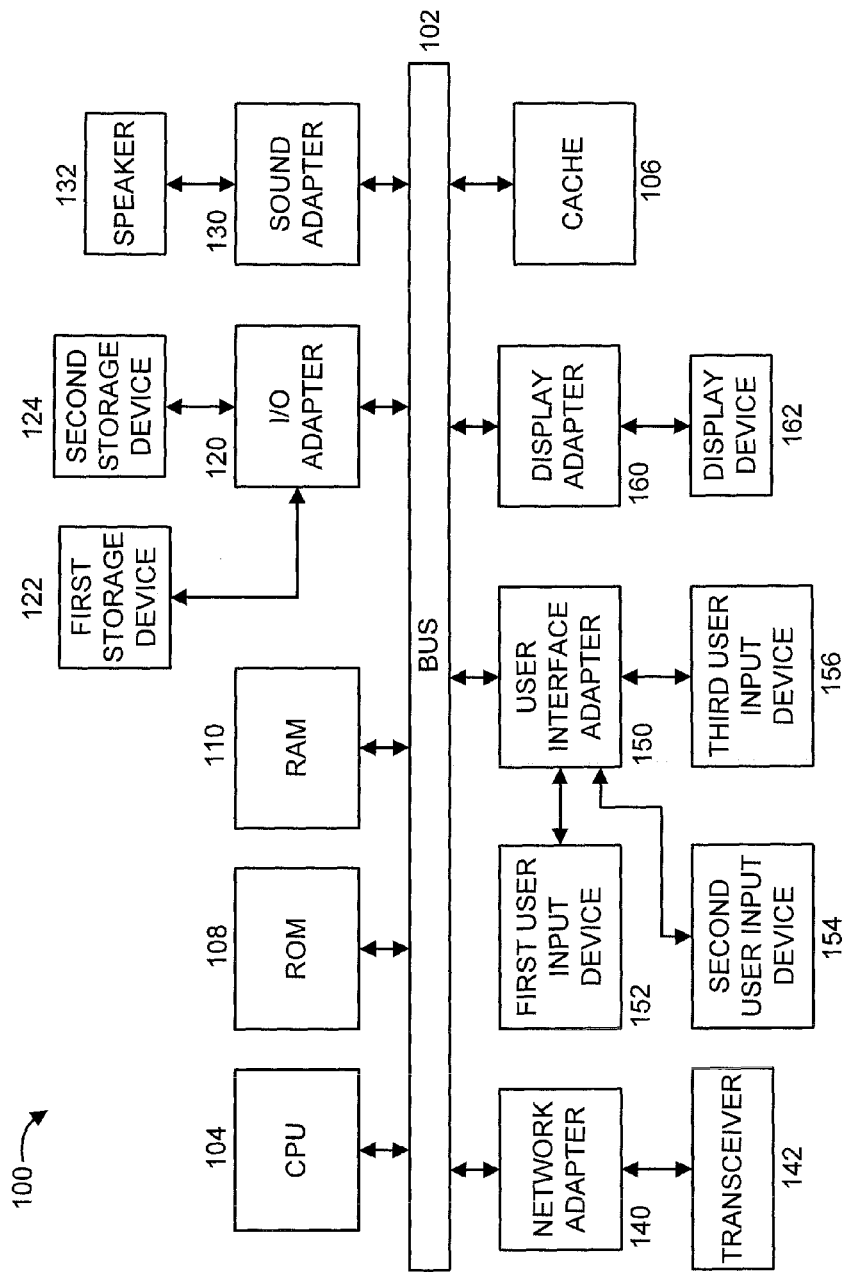
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
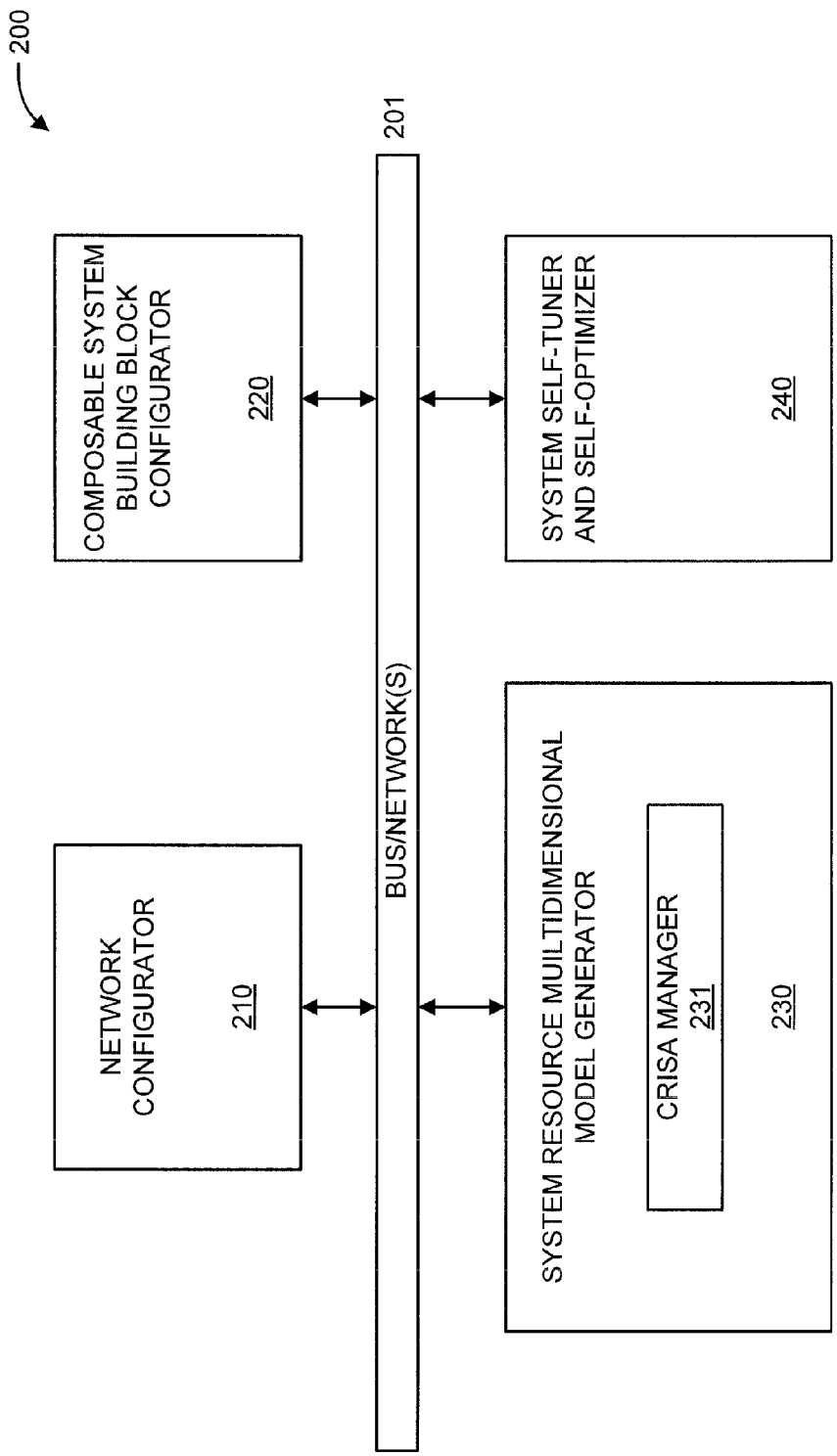
FIG. 2 shows an exemplary system 200 for creating a cloud resource instruction set architecture (CRISA), in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
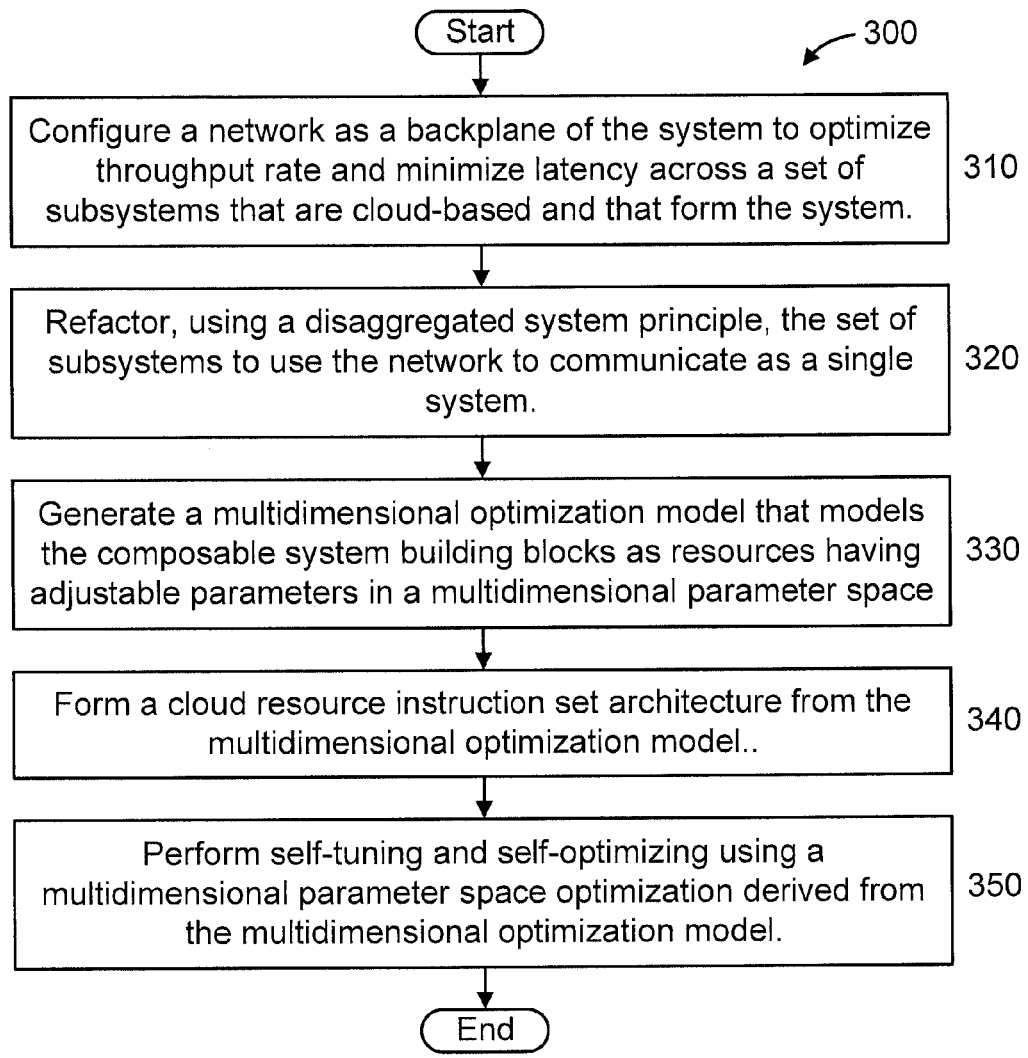
FIG. 3 shows an exemplary method 300 for creating a cloud resource instruction set architecture (CRISA), in accordance with an embodiment of the present principles.
Figure 4:
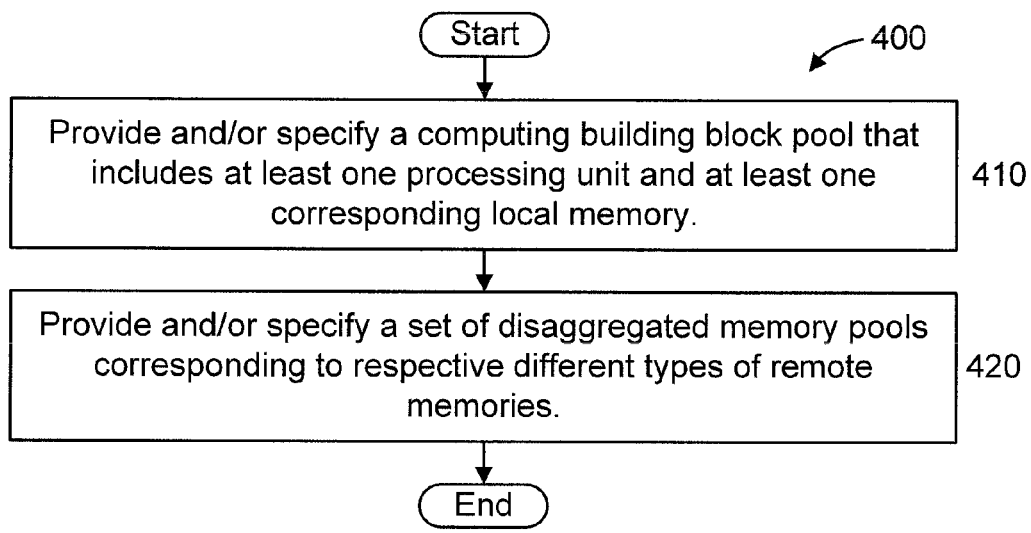
FIG. 4 shows an exemplary method 400 for creating a physical view of a cloud resource instruction set architecture (CRISA), in accordance with an embodiment of the present principles.
Figure 5:
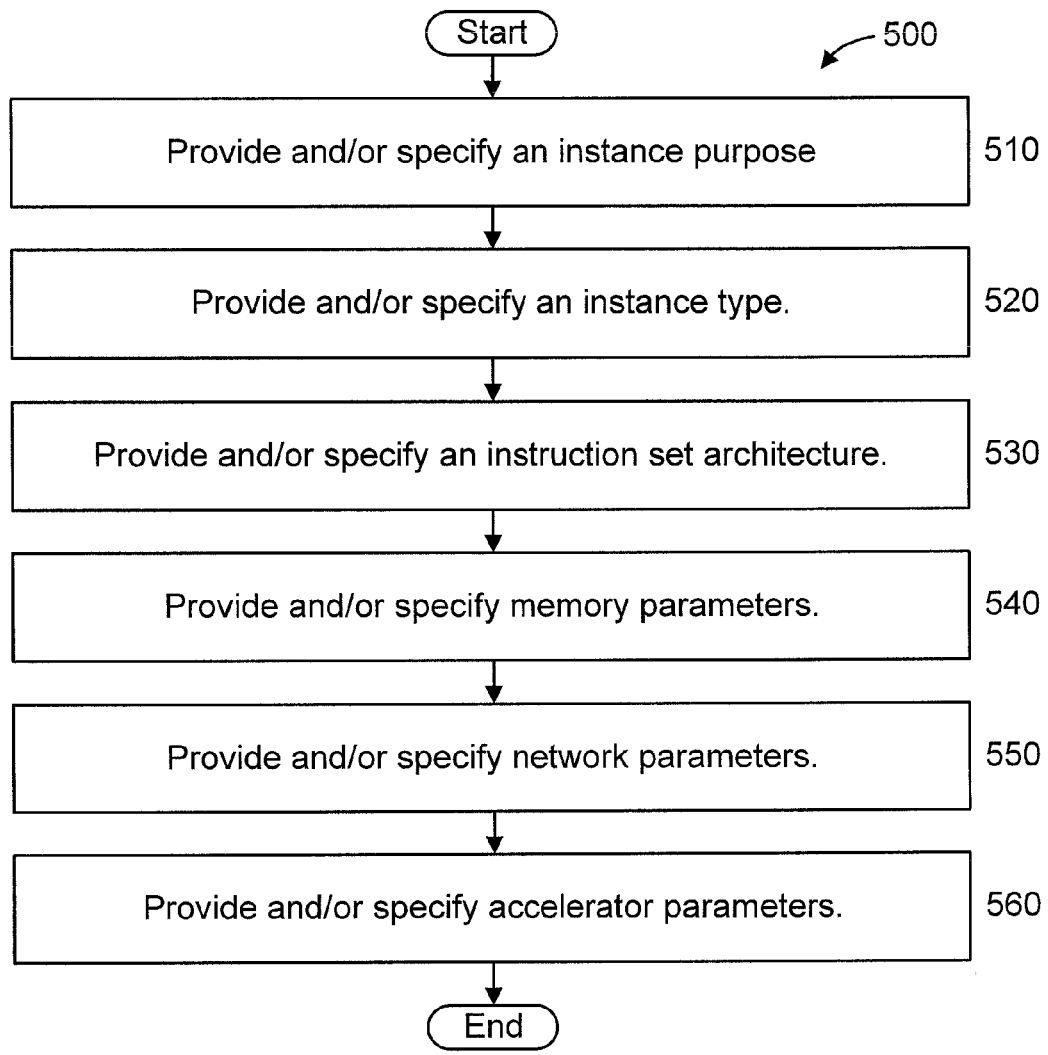
FIG. 5 shows an exemplary method 500 for creating a logical view of a cloud resource instruction set architecture (CRISA), in accordance with an embodiment of the present principles.
Figure 6:
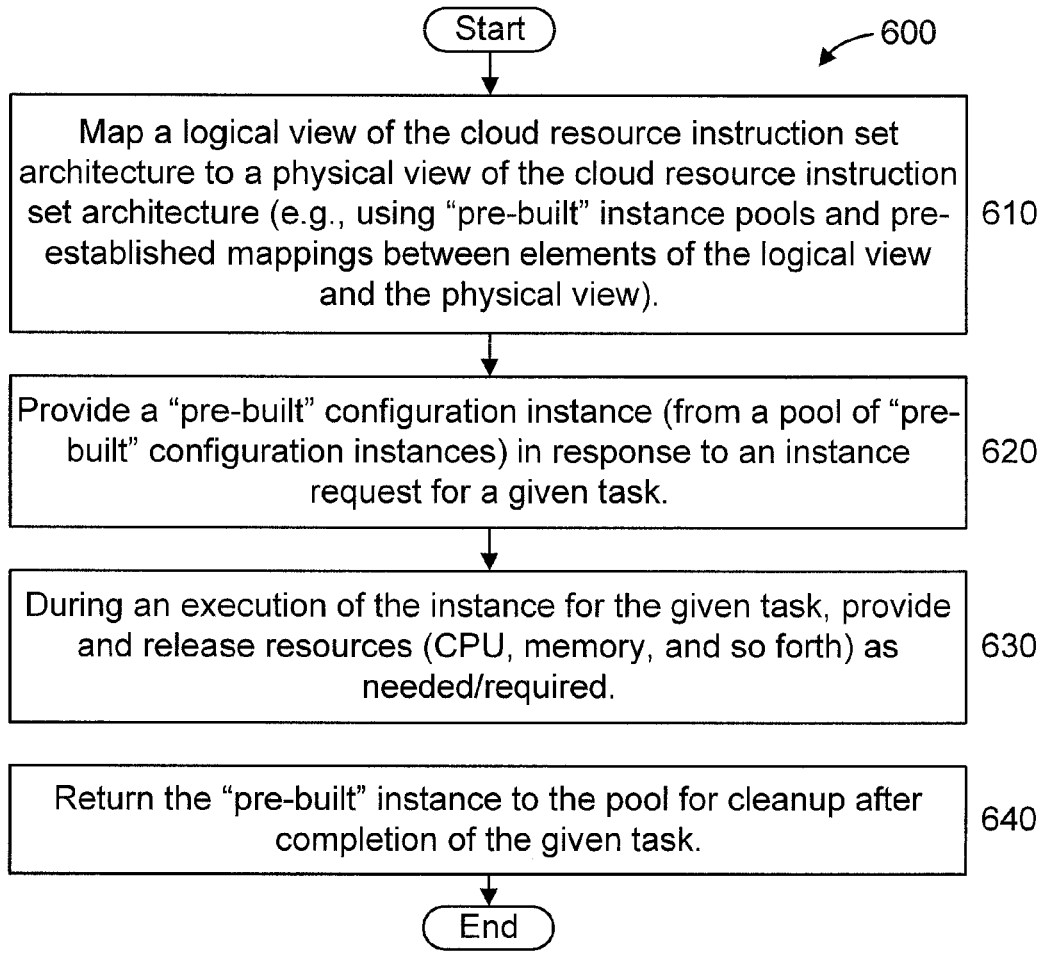
FIG. 6 shows an exemplary method 600 for performing a runtime operation for a cloud resource instruction set architecture (CRISA), in accordance with an embodiment of the present principles.

Further, it is to be appreciated that processing system 100 may perform at least part of the method described herein including, for example, at least part of method 300 of FIG. 3 and/or at least part of method 400 of FIG. 4 and/or at least part of method 500 of FIG. 5 and/or at least part of method 600 of FIG. 6. Similarly, part or all of system 200 may be used to perform at least part of method 300 of FIG. 3 and/or at least part of method 400 of FIG. 4 and/or at least part of method 500 of FIG. 5 and/or at least part of method 600 of FIG. 6.

FIG. 2 shows an exemplary system 200 for creating a cloud resource instruction set architecture (CRISA), in accordance with an embodiment of the present principles. The system 200 includes a composable subsystem and software leveraging applicable to both disaggregated and hyper-converged subsystems. While even a simple home computing system can have a memory system, and so forth, for the sake of consistent name convention for illustrative purposes with respect to FIGS. 2-6, all systems that are part of and/or otherwise involved with system 200 are referred to as subsystems of system 200.

The system 200 can include a network configurator 210, a composable system building block configurator 220, a system resource multidimensional model generator 230, and a system self-tuner and self-optimizer 240.

The network configurator 210 configures a network as a backplane of the system to optimize throughput rate and minimize latency across a set of subsystems that are cloud-based and that form the system. The set of subsystems include hardware and software subsystems. Moreover, as noted above, the set of subsystems can include disaggregated and hyper-converged subsystems.

The composable system building block configurator 220 refactors, based on a disaggregated system principle, the set of subsystems to use the network to communicate as a single system.

The system resource multidimensional model generator 230 generates a multidimensional optimization model that models the composable system building blocks as resources having adjustable parameters in a multidimensional parameter space. In an embodiment, a cloud resource instruction set architecture (CRISA) is formed from the multidimensional optimization model. In an embodiment, the system resource multidimensional model generator 230 includes a CRISA manager 231 for generating and/or updating the CRISA.

The system self-tuner and self-optimizer 240 self-tunes and self-optimizes the system using a multidimensional parameter space optimization derived from the multidimensional optimization model. The system self-tuner and self-optimizer 240 is configured to be responsive to changing system configuration requirements caused by workload constraints. The system self-tuner and self-optimizer 240 supports component level replacement in any of the plurality of subsystems independent of other subsystem components.

More functions and features of the above elements of system 200 are described herein.

In the embodiment shown in FIG. 2, the elements thereof are interconnected by a bus 201/network(s). However, in other embodiments, other types of connections can also be used. Moreover, in an embodiment, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of system 200 may be incorporated in a distributed fashion in one or more separate devices including separate servers and the like. For example, different elements can be located at different locations. Further, one or more of these elements can involve one or more datacenters. Additionally, one or more of these elements can involve one or more of infrastructure services, information management services, composition services, middleware, corresponding applications, and so forth as readily appreciated by one of ordinary skill in the art, given the teachings of the present principles provided herein. Also, more than one instance of any of the elements can be used in an embodiment of the present principles. Moreover, system 200 can be implemented using cloud technology and configurations as described herein. These and other variations of the elements of system 200 are readily determined by one of ordinary skill in the art, given the teachings of the present principles provided herein, while maintaining the spirit of the present principles.

FIG. 3 shows an exemplary method 300 for creating a cloud resource instruction set architecture (CRISA), in accordance with an embodiment of the present principles.

At step 310, configure a network as a backplane of the system to optimize throughput rate and minimize latency across a set of subsystems that are cloud-based and that form the system. The set of subsystems include hardware and software subsystems.

At step 320, refactor, using a disaggregated system principle, the set of subsystems to use the network to communicate as a single system.

At step 330, generate a multidimensional optimization model that models the composable system building blocks as resources having adjustable parameters in a multidimensional parameter space.

At step 340, form a cloud resource instruction set architecture from the multidimensional optimization model.

At step 350, perform self-tuning and self-optimizing using a multidimensional parameter space optimization derived from the multidimensional optimization model.

FIG. 4 shows an exemplary method 400 for creating a physical view of a cloud resource instruction set architecture (CRISA), in accordance with an embodiment of the present principles. Method 400 can apply to disaggregated resources of the system.

At step 410, provide and/or specify a computing building block pool that includes at least one processing unit and at least one corresponding local memory.

At step 420, provide and/or specify a set of disaggregated memory pools corresponding to respective different types of remote memories.

Of course, a physical view of a CRISA in accordance with the present principles is not solely limited to preceding items and can involve other items as well as substitute other items in place of one or more of the above items, while maintaining the spirit of the present principles.

FIG. 5 shows an exemplary method 500 for creating a logical view of a cloud resource instruction set architecture (CRISA), in accordance with an embodiment of the present principles. Method 500 is performed for each different of a set of different system configurations.

At step 510, provide and/or specify an instance purpose.
At step 520, provide and/or specify an instance type.
At step 530, provide and/or specify an instruction set architecture.
At step 540, provide and/or specify memory parameters.
At step 550, provide and/or specify network parameters.
At step 560, provide and/or specify accelerator parameters.

Of course, a logical view of a CRISA in accordance with the present principles is not solely limited to preceding items and can involve other items as well as substitute other items in place of one or more of the above items, while maintaining the spirit of the present principles.

FIG. 6 shows an exemplary method 600 for performing a runtime operation for a cloud resource instruction set architecture (CRISA), in accordance with an embodiment of the present principles.

At step 610, map a logical view (e.g., the logical view generated by method 500 of FIG. 5) of the cloud resource instruction set architecture to a physical view (e.g., the physical view generated by method 400 of FIG. 4) of the cloud resource instruction set architecture. In an embodiment, the runtime operation uses pre-configured ("pre-built") instance pools and pre-established mappings between elements of the logical view and the physical view.

At step 620, provide a "pre-built" configuration instance (from a pool of "pre-built" configuration instances) in response to an instance request for a given task.

At step 630, during an execution of the instance for the given task, provide and release resources (central processing unit (CPU), memory, and so forth) as needed/required.

At step 640, return the "pre-built" instance to the pool for cleanup after completion of the given task.

The rapid growth of cloud computing both in terms of the spectrum and volume of cloud workloads brought many challenges to the traditional data center design such as, for example, fast changing system configuration requirements due to workload constraints, varying innovation cycles of system components, a paradox between maximal performance and maximal sharing of systems and subsystems.

Regarding fast changing system configuration requirements due to workload constraints, systems in a cloud computing environment often have to be configured differently in response to different workload requirements. Specific workloads that require special attention on the configurations include many emerging cluster in-memory middleware and applications such as Cassandra®, MemcacheD, Apache Spark (and the entire Spark ecosystem such as SparkSQL, SparkR, SparkStream, GraphX, MLlib, and BlinkDB), MapReduce, Graph analytics, and various multimedia and scientific computing applications. For example, in-memory databases will need a large main memory, a MapReduce workload using Hadoop® File System (HDFS) will need high throughput input/output (I/O) and a large amount of local storage, and various multimedia and scientific computing applications can benefit from accelerators (e.g., graphical processing units (GPUs), field programming gate arrays (FPGAs), etc.). The form factor of properly configured systems will be different when trying to accommodate large local memory, storage, or accelerators. Thus, the overall form factor of a cloud data center is impacted by how each of the system is configured, as larger local memory and storage and additional accelerators (GPUs, FPGAs, etc.)

through peripheral component interconnect express (PCIe) cards require a larger footprint for the system and decrease the overall density.

We will now describe several examples. In the first example, a typical server system configured with only CPU and memory while using a remote storage subsystem (which also includes a storage controller and memory) is likely to be applicable to workloads which do not require large I/O bandwidth and will only need to use the storage occasionally. This configuration is usually inexpensive and versatile, but unlikely to perform well when large I/O bandwidth or small latency become pertinent. In the second example, the server system includes a storage controller and memory, but also includes a solid state drive (SSD). The configuration of the second example is more suitable for workloads that need larger I/O bandwidth and local storage. This configuration, however, is likely to become expensive. Moreover, the SSD configured within the system could be potentially wasted if the systems are provisioned for workloads that can be satisfied with remote network attached storage.

Regarding varying innovation cycles of system components, Traditional systems are limited by having a fixed lifecycle for the entire system. As a result, all of the components within a system (e.g., a server, storage, switches, etc.) are replaced at the same time. The "synchronous" nature of replacing the whole system at the same time prevents earlier adoption of newer technology at the component level, whether it is a memory, a solid state drive (SSD), a GPU, a FPGA, the power supply, the fans, and so forth.

Regarding the paradox between maximal performance and maximal sharing of systems and subsystems, system resources (memory, storage, and accelerators) in traditional centralized computing with SMP (symmetric multi-processing) architecture allows full resource sharing (share everything). Resource utilization has been routinely achieved at close to full utilization. However, it is often cost prohibitive to scale this architecture to an Internet scale datacenter. A distributed and fully decentralized architecture does not permit any physical resource sharing (share nothing) to enable easier scaling as each of the node within such an architecture are loosely coupled and connected through a datacenter network. These resources (e.g., memory, storage, and accelerators) are not directly sharable across the datacenter, and are only accessible within the "system" they are in. As a result, resource utilization can be fundamentally constrained (i.e., too low). Those resource configured as remote (or network attached) allow maximal sharing but the performance in terms of throughput and latency can be poor due to the bandwidth, latency, and quality of service limitations of traditional datacenter networks.

We now further address various elements of the present principles, including the network being used/configured as a system backplane; the composable system building blocks; the multidimensional capability and capacity relationship abstraction of underlying composable system building blocks as resources to enable resource optimization as a high dimensional parameter space optimization; and the mechanism and/or framework for self-tuning and self-optimization of the overall system.

Regarding the networking becoming the new backplane, we utilize a high throughput low latency network as the backplane of the "system" which can vary from a rack, cluster of racks, one or more pods, one or more zones, and one or more datacenters. Datacenter networks have gone through significant architecture evolutions during the past few years. Traditional datacenter networks are often based on a three-tier architecture that includes a top-of-the-rack (TOR) switch, an aggregation switch, and a core switch. These datacenter networks often utilize "fat tree" routing of packets between ports. This architecture is adequate to address traditional client-server computing models where the traffic patterns often originate from server nodes inside the datacenter to client nodes outside of the datacenter (or vice versa) and are often referred to as North-South traffic patterns. Emerging cloud centric workload patterns including Virtual Machine migration, big data analytics (including MapReduce), and other massive clustering operations require nodes within a datacenter to communicate with each other on a frequent basis and produce large amount of East-West traffic. This traffic pattern experiences excessive latency in the traditional three-tier architecture as each packet has to traverse multiple hops within the "fat tree" routing in order to travel from one computing node to the other computing node of the datacenter. East-West traffic patterns drove datacenters to embrace a flatter network topology such as those based on spine-leaf models (two-tier) or spline models (single-tier). The flatter network topology and the rapid progression of the network speed enable datacenter networks to achieve high bandwidth and low latency operation between nodes.

During the past 3 decades, the gap between the backplane technologies (as represented by PCIe) and network technologies (as represented by Ethernet) is quickly shrinking. During the next decade, the gap between next generation PCIe and next generation Ethernet is projected to be virtually nonexistent. When the backplane speed is not much faster than the network speed, that potentially allows the possibilities of refactoring systems and subsystems in many interesting ways as they no longer have to be in the same "box" in order to have high throughput. It is to be noted that latency will still be limited by the distance that signals need to travel as signals cannot travel faster than the speed of light.

As the network speed becomes comparable to the backplane speed, the dilemma we described earlier in which we have to choose between a high performance configuration (where all of the pertinent subsystems are located on the same backplane) versus a general configuration (where the system components are network attached) will vanish, as shown below. In this case, the SSD and storage (e.g., serial-attached small computer system interface (SAS), serial advanced technology attachment (SATA), etc.) are connected through high speed network to the CPU/memory module. This configuration allow maximal amount of sharing and maximal amount of flexibility to address the complete spectrum of potential workload.

Regarding the composable system building blocks based on disaggregated system principle, the systems and subsystems (which could be hyper-converged) within a data center are refactored so that all of the subsystems can use the network "backplane" to communicate as a single system.

Composable "systems" can be in the network, storage and server areas. In the networking area, traditional switching systems monolithically (or vertically) integrate physical switches, routing table, controllers, operating systems, system and network management, and applications within the same "box". Increasingly, newer generation switches logically and physically separate the data planes (hardware switches and routing table) from the control planes (controller and OS and applications) and management planes (system and network management) and allow the disaggregation of switching systems into the following three subsystems: control planes; management planes; and data planes. Control and management planes can reside anywhere within a data center, while the data planes serve as the traditional role for switching data.

Similar to the switching system, storage systems are taking a similar path, where the traditional monolithically (or vertically) integrated storage systems that include a hard disk drive (HDD), controllers, cache (including SSD), and special function accelerators for compression and encryption are transitions into logically and physically distinct data planes, that is, JBOD (just bunch of drives), control planes (controllers, cache, SSD) and management planes.

As an example, current EMC VIPER software defined storage is really based on a disaggregated architecture where the resource pools (JBOD, controllers, and cache/SSD) are wired together through logical switches (virtual Ethernet device) and formed the virtual block device.

The benefit of this approach for storage subsystems includes: (1) improving all facets of security; (2) increasing the breadth of available instance types within a resource class; (3) decreasing resource delivery time/Improving capacity management; (4) increasing average utilization by improving resource scheduling; (5) decreasing frequency of outages, both scheduled and unscheduled; (6) decreasing the time to recover from an outage.

An example of a known disaggregated server can involve part of the memory from each server "box" being disaggregated and then aggregated as a separate "box". The total amount of memory is identical between left and right hand side. Even though each server "box" has smaller amount of memory, it is already sufficient to address a substantial portion of the workloads. Also, for some of the other large memory footprint workloads, this approach actually helps to improve the performance due to the existence of a single large contiguous memory. The Cisco® UCS M-series modular server is an example of a disaggregated server design where the storage and external network are attached to the chassis and the compute portion of the node only includes processor and memory. The benefit of this approach is the possibility of upgrading the compute nodes with newer processor and/or memory technologies without having to replace the entire chassis.

The composable system concept is applicable to the formation of a "virtual" rack that includes rack mounted cases (1U, 2U, or other form factors) where the physical rack mounted cases are located elsewhere in the datacenter. Similarly, the composable system concept can also be applied to the formation of a "virtual pod" where the racks within a "virtual pod" are located elsewhere within the datacenter.

In summary, the disaggregated systems enable complete refactoring of server, storage, and switching systems within a data center, and allows dramatically different workloads to have maximal throughput and sharing of components most if not all the time. In such an environment, the storage, switching, and computing resources will be pooled together, and be composed through software defined infrastructure as needed by the specific workloads.

Regarding the multidimensional capability and capacity relationship abstraction of underlying composable system building blocks as resources to enable system resource optimization as a high dimensional parameter space optimization, we further note the following. The abstracted composable system resource model provides the combination of abstracting the capability, the capacity, and the physical environments such as clustering, pod, availability zones, and datacenter in terms of their topology (for example, the sharing of a common switch, power distribution unit (UPS), uninterruptible power supply (UPS), or backup generator). This abstraction forms the basis of the cloud resource instruction set architecture (CRISA). CRISA also enables dynamically stitched together physical resources to be used as logical resources for compute, storage and network functions based on anticipated the workload requirements for the maximal amount of workload throughput, resource sharing and utilization.

In an embodiment, CRISA can include the following three areas: (1) defining the binding of the logical resource to the physical resources; (2) defining the operations that can be applied against the abstraction; and (3) defining the environment and context of resources and operations, including the affinity among resources.

Regarding the binding of the logical resources to the physical resources, such binding can include:
(1) Physical resource entities at the subsystem level for compute, storage, and networking. The entities are in terms of capabilities and capacity.
(2) Physical resource relationships at the subsystem level. For example, physical resource relationships can be specified within the same rack, same cluster, same POD, same zone, and/or the same datacenter.
(3) The wiring of these physical resource entities—such as wiring of JBOD (just bunch of drives) HDDs, network adapter cards, SSDs, memory, and controllers as logical block storage.

The logical view of CRISA includes the following:
(a) Instance purpose: general purpose, compute optimized, memory optimized, storage optimized, with accelerator (e.g. GPU and FPGA), and micro instance. The instance purpose gives the motivation for a specific logical configuration.
(b) Instance type: provides multiple configurations within the same instance purpose.
(c) ISA: x86, POWER, ARM, (64 bit or 32 bit).
(d) Virtualized "CPU" (vCPU): which is often mapped to a hardware hyper-thread.
(e) Performance benchmark "vector": This will enable performance comparisons between different instance types. AMAZON® used ECU (Elastic Computing Unit) at one point to provide approximation.
(f) Memory: memory size.
(g) Instance storage: # of "spindles"*the storage capacity of each "spindle".
(h) Storage type optimized: computing instance that are optimized for file, blocks, object store or long-term archival storage (also referred to as cold storage).
(i) Network: often including requirements on bandwidth (100 M, 1 G, 10 G, 40 G, etc.) and latency between ports.
(j) Accelerator: including GPU, FPGA, or other accelerators.

This logical view can be easily mapped to the current abstraction offered by various public clouds (such as Amazon® AWS) or open source OpenStack.

The physical view of the disaggregated resources include:
(a) Basic computing building block pool: including CPU, local memory, local flash memory, local SSD, and local storage.
(b) Disaggregated memory pool.
(c) Disaggregated flash memory (e.g., phase change memory (PCM)) pool.
(d) Disaggregated SSD pool.
(e) Disaggregated storage pool.

In general, the physical resources could include a complete memory hierarchy that, in turn, includes main memory, slower (but cheaper and perhaps persistent) memory, faster storage (e.g. SSD), regular storage (HDD), and cold storage (tape or optical disks) with different access latencies and throughputs. This is why we provide distinct memory and storage pools.

As is evident, the logical view and physical view can include context information regarding a given resource and operations performed thereby and/or with respect thereto.

The CRISA Runtime is responsible for mapping from the logical view of CRISA to the physical view of CRISA, and is accomplished through the following:

(a) Pre-configured instance pools where the mapping from the instance type to the computing nodes and the associated disaggregated memory, storage, GPU, and so forth are established in advance.

(b) When an instance is requested or recommended by the workload manager, a "pre-built" instance is given to the requestor from the instance pool, and returned to the instance pool for clean up at the end of a task.

(c) During the execution of the instance, additional memory, storage, and/or GPU(s) can be requested or released.

A simple way of constructing the dynamic environment is through treating local memory, remote memory (disaggregated memory), remote flash memory (disaggregated flash memory), remote SSD (disaggregated SSD), remote storage (disaggregated storage) as swapping space. In such a case, a "page" miss at the local memory can cause the page to be retrieved from the "closest" location in the memory hierarchy.

CRISA Tooling is the set of tools that allow the identification of instance configuration based on the workload, produces the initial recommendation of the configuration, monitors the workload continuously, and develops the best projection for the optimal configuration continuously.

The CRISA library includes support for identity management, data layer services, graph db, NoSQL, and so forth, which form the basis for various platforms such as Platform as a Service (PaaS) and Software as a Service (SaaS).

A significant feature of CRISA is to assist refactoring, aggregation at scale.

When the resources within a data center are completely disaggregated into resource pools, infrastructure can then be composed based on the capacity and capabilities required in terms of compute, storage, and networking. The composition will be policy based where a specific target "service level agreement" will drive the continuous reformulation of the resources that contribute to the system. Consequently, resource pool will instantaneously reflect new hardware components after those components are introduced to the disaggregated data center. The resource in the resource pool will then be leveraged by the higher level workload as needed by the workloads.

Regarding the mechanism and/or framework for self-tuning and self-optimization of the overall system using the multidimensional parameter space that allowed the parameters or knobs of the composable systems to be continuously adjusted for optimal performance, we further note the following.

Manual tuning of emerging big data workload, such as the Terasort benchmark for MapReduce as an example, often takes a very long time as there are hundreds of parameters need to be tweaked. These parameters include hardware configuration (# of simultaneous multi-threading (SMT) threads, prefetching, size of on chip cache, memory and IO bandwidth), storage (software redundant array of independent disks (RAID), load balancer), Java Virtual Machine (JVM) (heap size, garbage collection and just in time compilation policy), platform symphony (buffer related to reduce I/O, smart scheduling, task granularity), specific compression algorithm used, etc. In this specific example, it took almost 18 months to reduce the benchmark from 47 minutes to 6 minute 41 seconds. It was estimated that at least 2-3 months will be needed for manually tweaking a new application.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
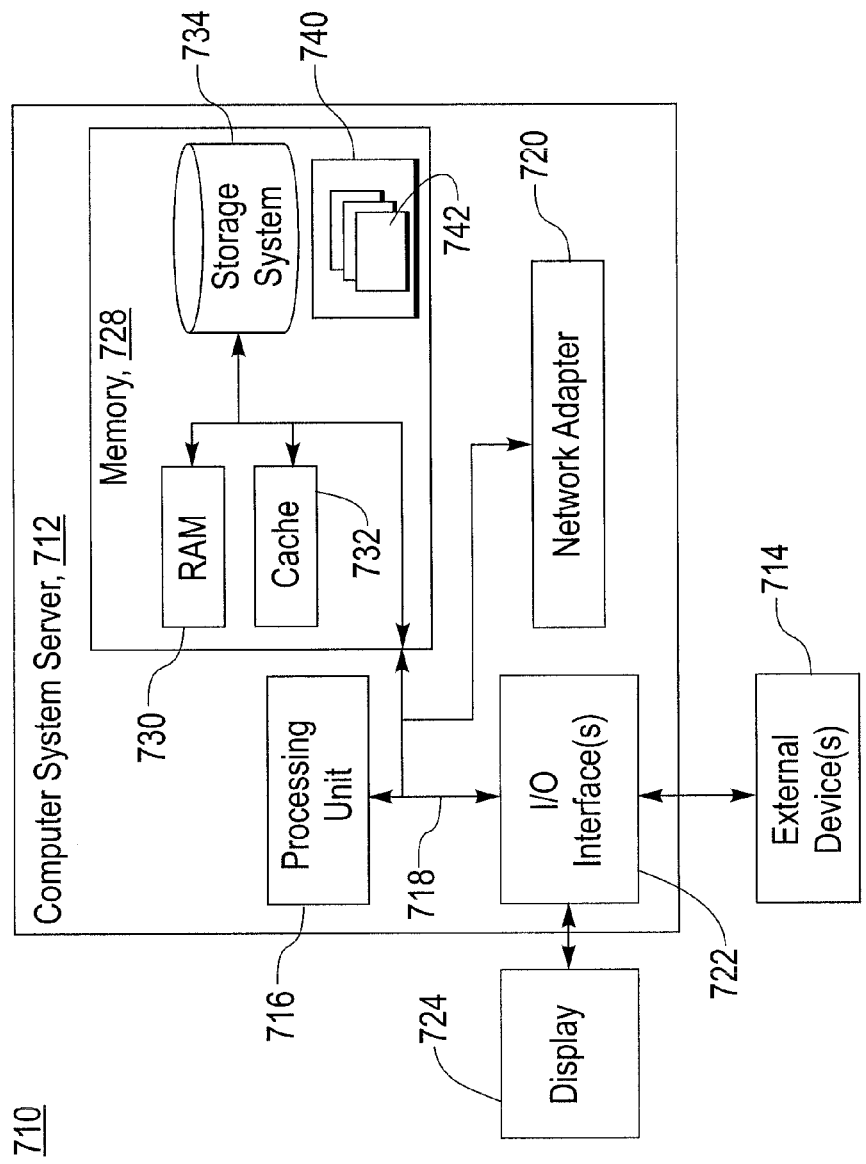
FIG. 7 shows an exemplary cloud computing node 710, in accordance with an embodiment of the present principles.

Referring now to FIG. 7, a schematic of an example of a cloud computing node 710 is shown. Cloud computing node 710 is only one example of a suitable cloud computing node and is not intended to suggest any limitation as to the scope of use or functionality of embodiments of the invention described herein. Regardless, cloud computing node 710 is capable of being implemented and/or performing any of the functionality set forth hereinabove.

In cloud computing node 710 there is a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in cloud computing node 710 is shown in the form of a general-purpose computing device. The components of computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

Figure 8:
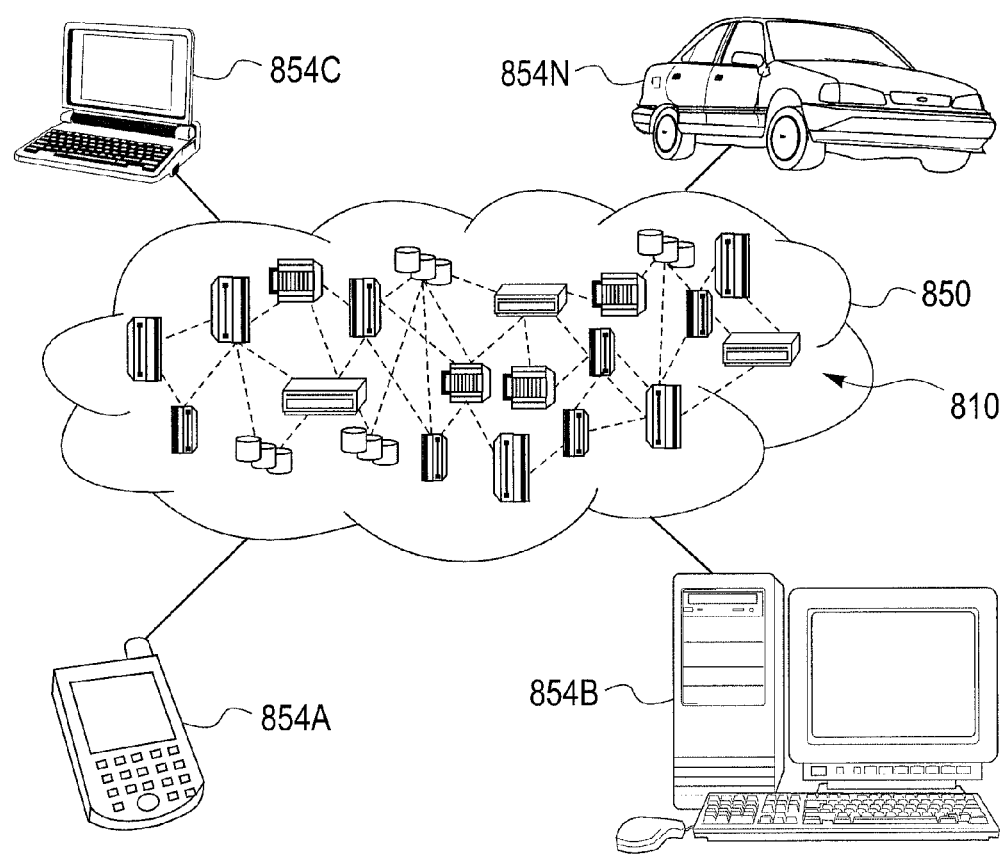
FIG. 8 shows an exemplary cloud computing environment 850, in accordance with an embodiment of the present principles.

Referring now to FIG. 8, illustrative cloud computing environment 850 is depicted. As shown, cloud computing environment 850 comprises one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
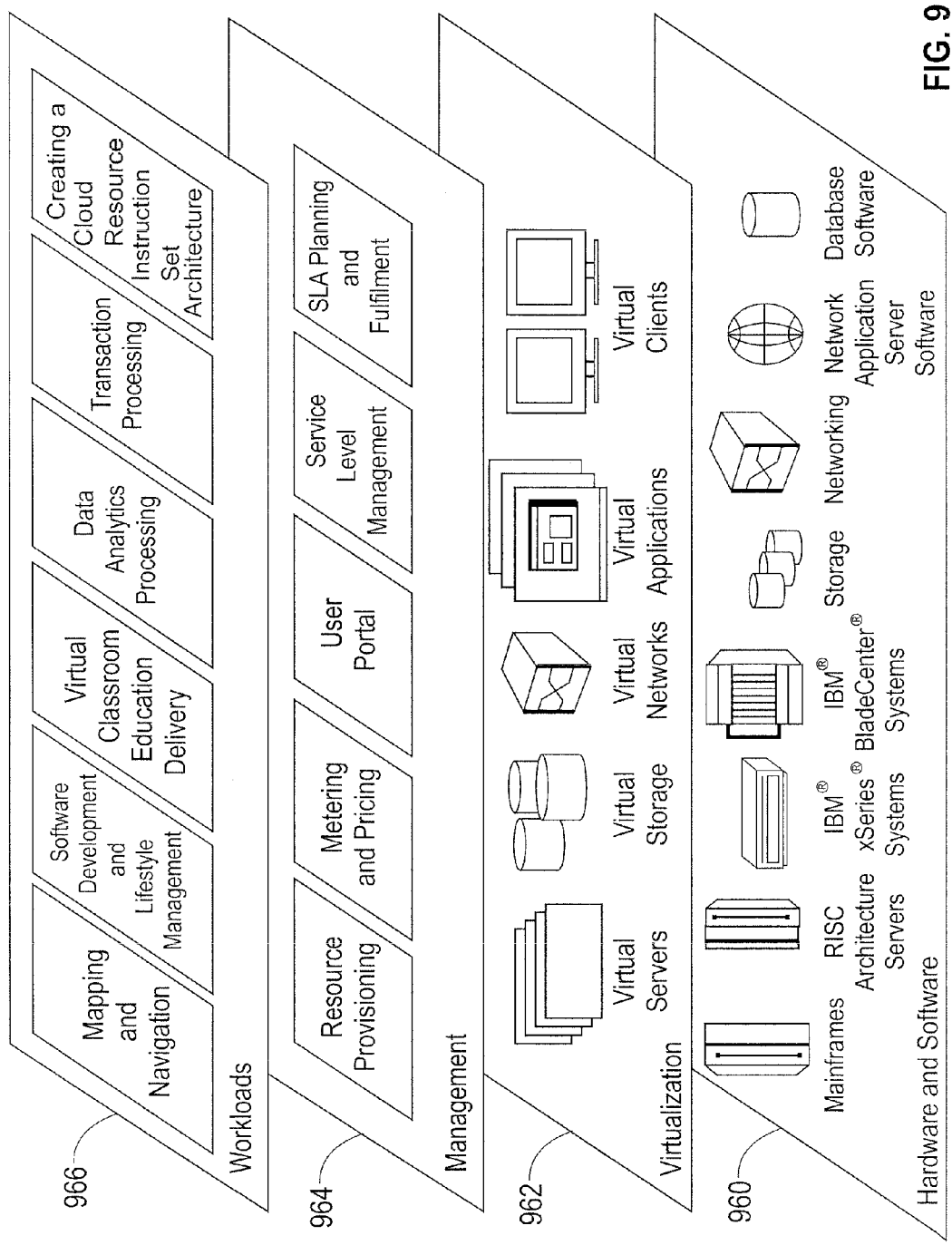
FIG. 9 shows exemplary abstraction model layers, in accordance with an embodiment of the present principles.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 962 provides an abstraction layer from which the following examples of virtual entities may be provided: virtual servers; virtual storage; virtual networks, including virtual private networks; virtual applications and operating systems; and virtual clients.

In one example, management layer 964 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 966 provides examples of functionality for which the cloud computing environment may be utilized. Examples of workloads and functions which may be provided from this layer include: mapping and navigation; software development and lifecycle management; virtual classroom education delivery; data analytics processing; transaction processing; and automated ontology building.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:
1. A method, comprising:
configuring, by a network configurator, a network as a backplane of a system to optimize throughput rate and minimize latency across a plurality of subsystems that are cloud-based and that form the system, the plurality of subsystems comprising hardware and software subsystems;
refactoring, by a composable system building block configurator using a disaggregated system principle, the plurality of subsystems to use the network to communicate as a single system; and
generating, by a system resource multidimensional model generator, a multidimensional optimization model that models composable system building blocks as resources having adjustable parameters in a multidimensional parameter space.

2. The method of claim 1, wherein a cloud resource instruction set architecture is formed from the multidimensional optimization model.

3. The method of claim 2, wherein the cloud resource instruction set architecture specifies a logical resource to physical resource binding, operations that can be applied against the multidimensional optimization model, an environment and context of physical resources, operations performed by the physical resources, and any affinities among the physical resources.

4. The method of claim 3, wherein the logical resource to physical resource binding comprises, for compute, storage, and networking the physical resources at a subsystem level, resource capabilities and capacities, physical resource location relationships, and physical resource connections.

* * * * *